United States Patent
Lee et al.

(10) Patent No.: US 8,284,493 B2
(45) Date of Patent: Oct. 9, 2012

(54) PROJECTION LENS UNIT FOR PICO-PROJECTOR

(75) Inventors: Hee-Joong Lee, Gyeonggi-do (KR); Young-Hun Lee, Chungcheongman-do (KR); Sung-Hoon Hwang, Seoul (KR); Seung-Ki Hong, Gyeonggi-do (KR)

(73) Assignee: Sekonix Co., Ltd., Gyeonggi-do (KR)

( * ) Notice: Subject to any disclaimer, the term of this patent is extended or adjusted under 35 U.S.C. 154(b) by 186 days.

(21) Appl. No.: 12/748,676

(22) Filed: Mar. 29, 2010

(65) Prior Publication Data
US 2011/0199690 A1    Aug. 18, 2011

(30) Foreign Application Priority Data

Feb. 18, 2010    (KR) .................. 10-2010-0014695

(51) Int. Cl.
*G02B 9/62*    (2006.01)
*G02B 3/02*    (2006.01)
(52) U.S. Cl. ......... 359/649; 359/713; 359/756; 359/759
(58) Field of Classification Search .................. 359/649, 359/708, 713, 714, 737, 754–757, 759, 763, 359/764, 767, 769
See application file for complete search history.

(56) References Cited

U.S. PATENT DOCUMENTS

| | | | | |
|---|---|---|---|---|
| 2,604,013 A | * | 7/1952 | Schade | 359/769 |
| 4,477,153 A | * | 10/1984 | Suda et al. | 359/680 |
| 5,822,129 A | * | 10/1998 | Sekine | 359/651 |

FOREIGN PATENT DOCUMENTS
KR    2008-0081806    3/2010

* cited by examiner

*Primary Examiner* — Darryl J Collins
(74) *Attorney, Agent, or Firm* — Robert L. Stearns; Dickinson Wright, PLLC

(57) ABSTRACT

There is provided a projection lens unit for a pico-projector which comprises a lens array, a color composition prism, a cover glass and an image panel, the projection lens unit characterized in that: the lens array includes $1^{st}$ to $6^{th}$ lenses sequentially arrayed from a screen on which an image is projected, the $1^{st}$ lens includes a stop side formed on a $1^{st}$ side of the $1^{st}$ lens, the stop side stops the passage of light, to perform the function of a diaphragm aperture, light passing from the $1^{st}$ lens to the $6^{th}$ lens travels in only one direction of the lens sides based on the diaphragm aperture, and parts of the lens sides through which the light does not pass are cut so that the whole height of the lens array is reduced.

6 Claims, 3 Drawing Sheets

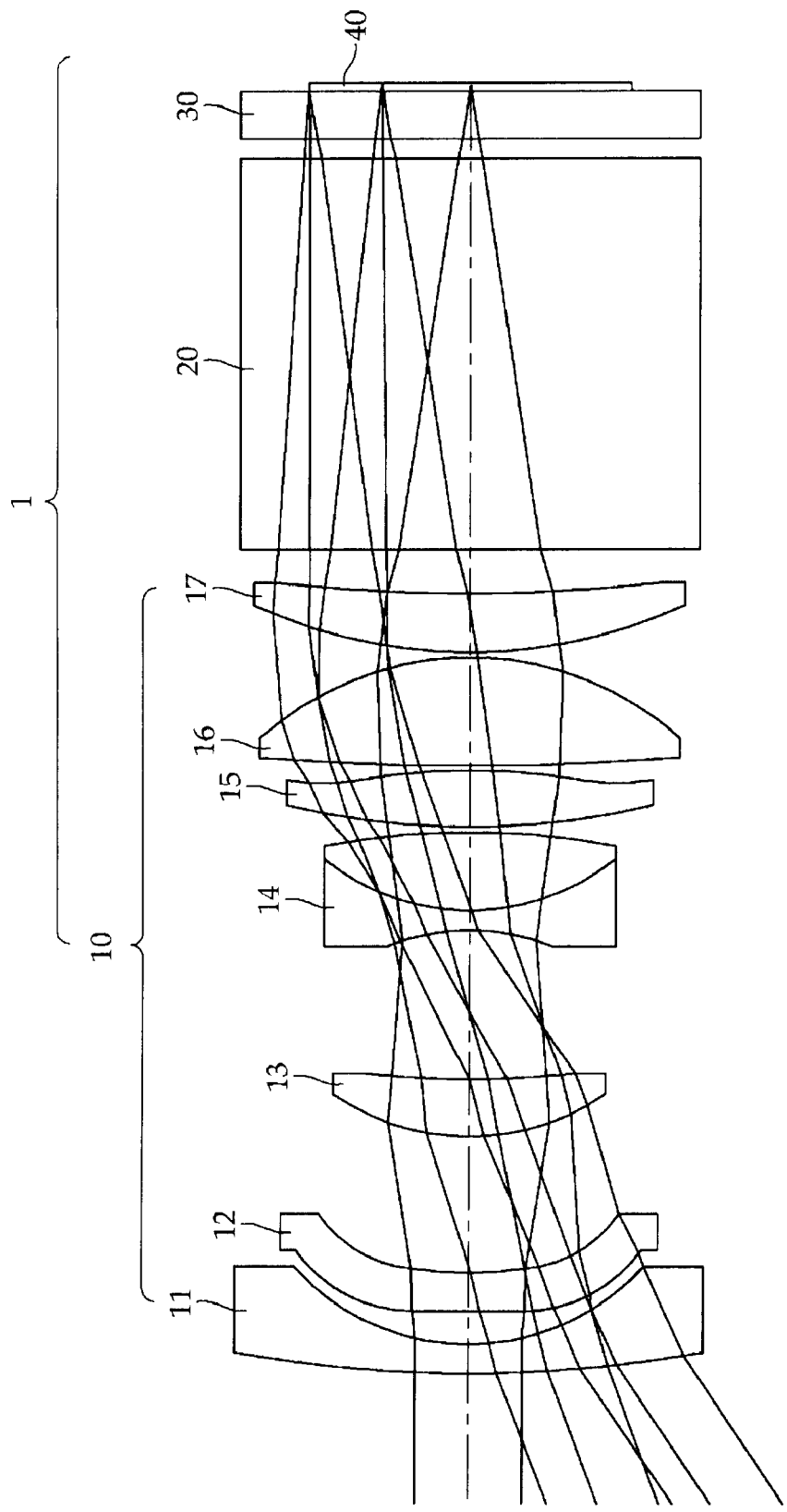
[FIG.1]

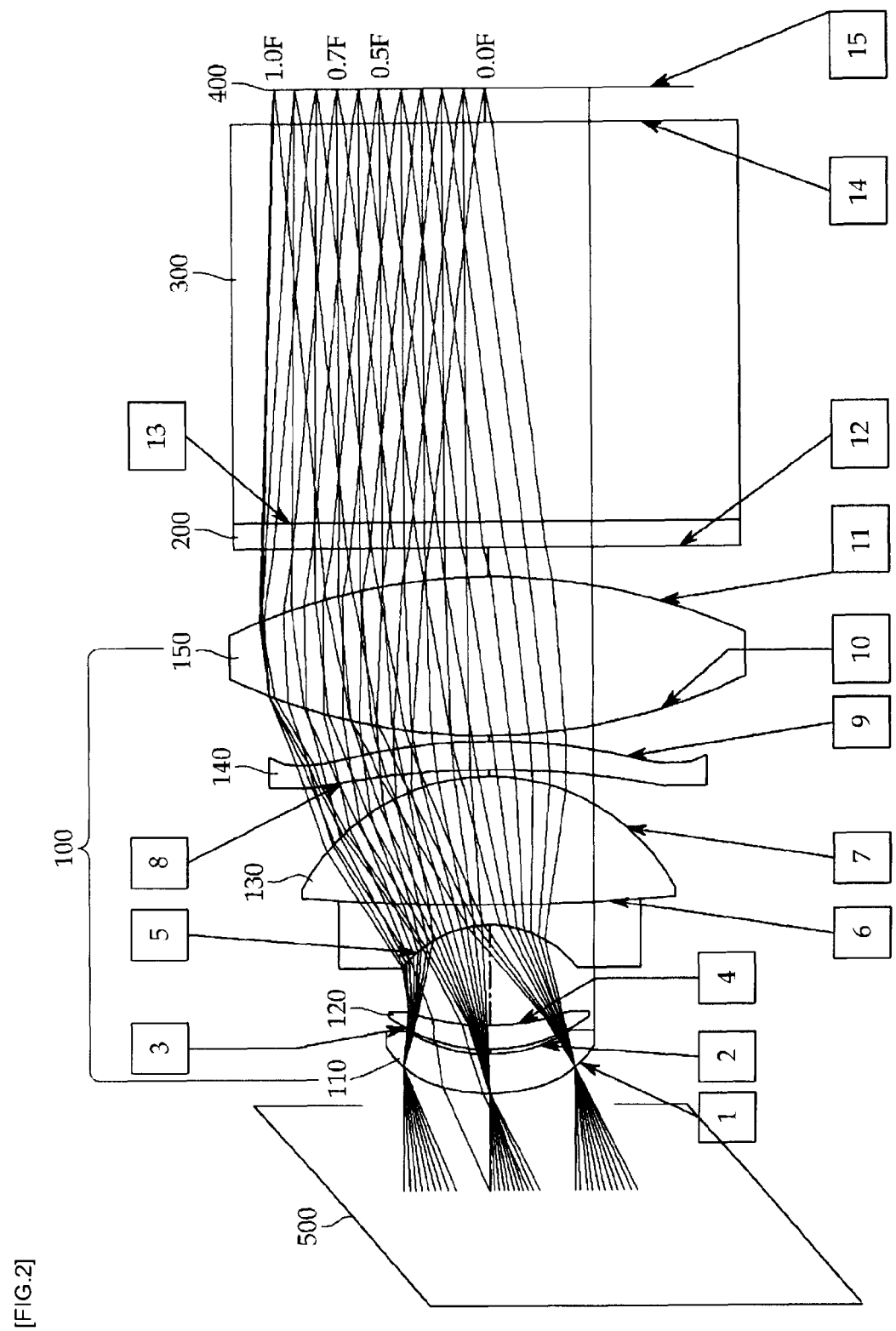
[FIG.2]

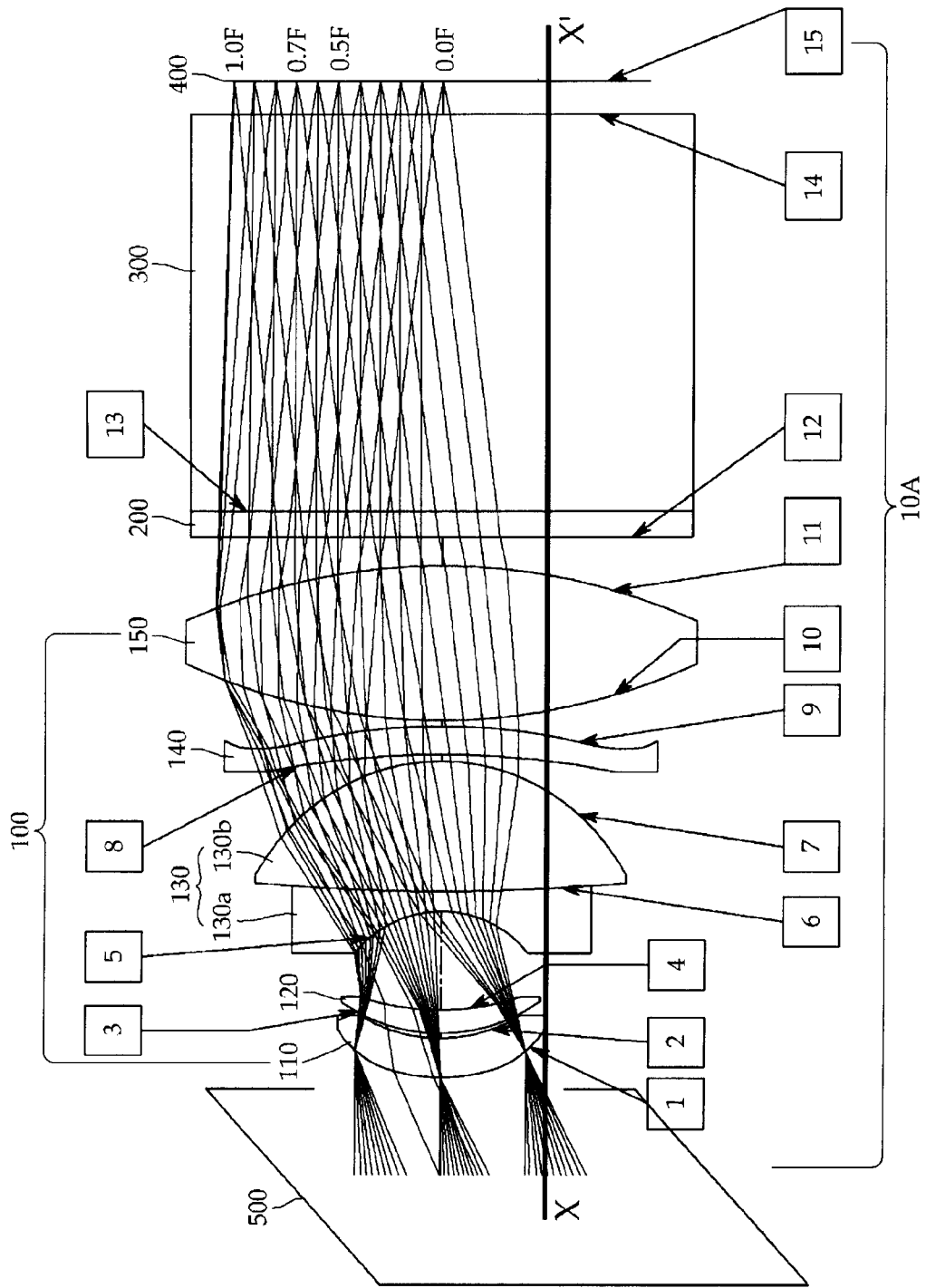

PROJECTION LENS UNIT FOR PICO-PROJECTOR

CROSS-REFERENCE TO RELATED APPLICATION

This application claims the benefit of Korean Patent Application No. 2010-0014695, filed Feb. 18, 2010, the disclosure of which is hereby incorporated herein by reference in its entirety.

BACKGROUND OF THE INVENTION

1. Field of the Invention

The present invention relates to a projection lens for a projector to enlarge and project a generated image on a screen or the like, and more particularly, to a projection lens for a pico-projector, to be installed in a small mobile device such as a mobile phone and to reduce a height of a lens array.

2. Description of the Related Art

As the electronic technology has been developed, the use of personal mobile devices, such as a mobile phone and a PDA, among others, has been rapidly increasing and the mobile devices with diverse functions of a MP3, a PMP, a camera and the like have been released.

In accordance with the multi-functional trends, a mobile device with the function of a micro projector known as a so-called pico-projector or nano-projector is launched.

In designing a lens for a small projector, it is important to achieve the lens in a minimum size and with a high-performance function. Further, the lens is to be low in cost and light in weight, to reduce distortion and magnification chromatic aberration, and to satisfy a relatively long back focus length.

For example, FIG. 1 illustrates a conventional lens unit 1 for a mini projector in which the full length is about 60 mm.

As illustrated in FIG. 1, the lens unit 1 for the mini projector comprises: a lens array 10 consisting of seven lenses, a prism 20 for color composition, a cover glass 30 and an image panel 40. The length from a $1^{st}$ lens 11 to a $7^{th}$ lens 17 of the lens array 10 is called the full length and the length from the $7^{th}$ lens 17 (the final lens as arrayed) to the image panel 40 is called the back focus length (BFL).

In the conventional lens unit 1 for a mini projector as illustrated in FIG. 1, the full length is generally about 60 mm and the back focus length is about 32 mm. However, the back focus length may vary according to the design of the lens array 10.

To use the lens unit 1 for a mini projector according to the conventional is art shown in FIG. 1, in which the full length is about 60 mm, as a lens unit for a pico-projector in which the full length is about 10 mm, it is possible to consider to relatively reduce the lens unit 1 for a min projector at a rate of about 1:10.

However, in the case of reducing the lens unit 1 for a mini projector in which the full length is about 60 mm to the lens unit for a pico-projector in which the full length is about 10 mm, the lens array 10 may be changed to be reduced in design but there are many limitations in reducing the diameter of the lens, i.e., the height of the lens.

SUMMARY OF THE INVENTION

Therefore, it is an object of the present invention to provide a projection lens unit for a pico-projector, whereby the full length is shortened and the height of the lens is reduced by decreasing the number of lenses forming a lens array.

In accordance with an embodiment of the present invention, there is provided a projection lens unit for a pico-projector which comprises a lens array, a color composition prism, a cover glass, and an image panel, the projection lens unit characterized in that the lens array includes $1^{st}$ to $6^{th}$ lenses sequentially arrayed from a screen on which an image is projected, the $1^{st}$ lens includes a stop side formed on a $1^{st}$ side of the $1^{st}$ lens, the stop side stops the passage of light, thereby performing the function of an aperture stop, light passing from the $1^{st}$ lens to the $6^{th}$ lens travels in only one direction of the lens sides based on the aperture stop, and parts of the lens sides through which the light does not pass are cut so that the whole height of the lens array is reduced.

The $1^{st}$ lens has a positive (+) refractive power, the $2^{nd}$ lens has the positive (+) refractive power, the $3^{rd}$ lens has a negative (−) refractive power, the $4^{th}$ lens has the positive (+) refractive power, the $5^{th}$ lens has the positive (+) refractive power, the $6^{th}$ lens has the positive (+) refractive power, and the $3^{rd}$ and $4^{th}$ lenses form a single doublet lens.

Further, the full length from the $1^{st}$ side of the $1^{st}$ lens to a $2^{nd}$ side of the $6^{th}$ lens is 13 mm or less, two of the $1^{st}$ to $6^{th}$ lenses are aspherical lenses, and preferably, the $1^{st}$ lens and $5^{th}$ lens may be formed to be aspheric.

Further, where focal distances of the $1^{st}$ lens to the $6^{th}$ lens are $f_1$, $f_2$, $f_{3-4}$, $f_5$, and $f_6$, respectively, a composite focal distance $f_{1-2}$ of the $1^{st}$ lens and the $2^{nd}$ lens and a composite focal distance $f_{3-6}$ of the $3^{rd}$ lens to the $6^{th}$ lens are designed to satisfy the following formula: $1<|f_{1-2}/f_{3-6}|<2$.

Further, the focal distance $f_2$ of the $2^{nd}$ lens and the focal distance $f_6$ of the $6^{th}$ lens are designed to satisfy the following formula: $1<|f_2/f_6|<2$. Then, preferably, the composite focal distance $f_{1-2}$ may be from 12 mm to 15 mm and the composite focal distance $f_{3-6}$ may be from 9 mm to 10 mm.

BRIEF DESCRIPTION OF THE DRAWINGS

The above and other features and advantages of the present invention will become more apparent to those of ordinary skill in the art by describing in detail a preferred embodiment thereof with reference to the attached drawings to in which:

FIG. 1 illustrates a conventional projection lens unit used for a mini projector;

FIG. 2 illustrates a projection lens unit for a pico-projector according to the present invention; and FIG. 3 illustrates a part of the projection lens unit for a pico-projector, which is taken along line X-X' of FIG. 2.

DETAILED DESCRIPTION OF THE PREFERRED EMBODIMENT

The present invention will now be described more fully hereinafter with reference to the accompanying drawings, in which a preferred embodiment of the invention is shown so that those of ordinary skill in the art can easily carry out the present invention.

FIG. 2 is a schematic view illustrating a projection lens unit 10A for a pico-projector according to the present invention.

The projection lens unit 10A as shown in FIG. 2 comprises: a lens array 100 consisting of six lens sheets, a cover glass 200, a color composition prism 300 and an image panel 400.

The lens array 100 forms a full length of a projection lens, and preferably, the full length may be 13 mm or less. In the lens array 100, $1^{st}$ to $6^{th}$ lenses 110, 120, 130a, 130b, 140 and 150 are sequentially positioned from a screen on which an image is projected.

A $1^{st}$ side of the $1^{st}$ lens 110 is set as the side to perform the function of an aperture stop in which a rate of a height of a beam of light in an optic system where light passes on the center axis of the lens array 100 to a size of a structure of the optic system is close to 1. The $1^{st}$ side and $2^{nd}$ side of the $1^{st}$ lens 110 have a positive (+) curvature to the screen. One lens sheet in a meniscus shape with a convex side toward the screen is used. That is, the $1^{st}$ lens has a positive refractive power.

3rd and 4th sides of the 2nd lens 120 have the positive curvature to the screen. The 2nd lens 120 uses one lens sheet in the meniscus shape with a convex side toward the screen. That is, the 2nd lens 120 has the positive refractive power.

In the embodiment of the present invention, the 3rd lens 130a and the 4th lens 130b are provided as a single doublet lens 130 at the rear of the 2nd lens 120 from the screen 150. The side of the 3rd lens 130 which is toward the screen 150 functions as a 5th side. The doublet side of the 3rd lens 130a and the 4th lens 130b functions as a 6th side. The other side of the 4th lens 130b than the side toward the screen 150 functions as a 7th side. In a zoom lens optic system including a camcorder, a digital camera and a projector, the off-axis aberrations, such as a high-order chromatic aberration among a magnification chromatic aberration, are minimized by using a high-dispersion lens (i.e., the 3rd lens 130a) and a low-dispersion lens (i.e., the 4th lens 130b) as the doublet lens. Due to this reason, the 3rd lens 130a and the 4th lens 130b are used as the doublet lens.

In this embodiment, the 3rd lens 130a used as the high-dispersion lens uses the lens with the Abbe number (which is a reciprocal of a dispersion value), Vd=28.32, and the 4th lens 130b uses the lens with the Abbe number, Vd=60.34. The 3rd lens 130a and the 4th lens 130b are designed to have a difference of 30 or more in the Abbe number.

Further, in the present invention, the 5th side of the 3rd lens 130a has a negative (−) curvature and the 6th side which is the doublet side has the positive curvature. The 7th side of the 4th lens 130b has the negative curvature. That is, a 3rd lens group consisting of the 3rd lens 130a and the 4th lens 130b has the negative refractive power.

Further, the 5th lens 140 is made of one lens sheet including an 8th side and a 9th side. The 8th side has the negative curvature and the 9th side also has the negative curvature. The 5th lens 140 has a meniscus shape with a convex top. That is, the 5th lens 140 has the positive refractive power.

Further, the 6th lens 150 is made of one lens sheet including a 10th side and an 11th side. The 10th side has the positive curvature and the 11th side has the negative curvature. The 6th lens 150 has a convex side toward the screen 500 and a convex top. That is, the 6th lens 150 has the positive refractive power. Then, the focal distance $f_6$ of the 6th lens 150 is less than 12 ($f_6<12$). Among the lenses of the lens array 100, the 6th lens 150 is designed to have the highest power.

In the structure of the lens array 100 according to the present invention, the 1st side of the 1st lens 110 performs the function of the aperture stop in which a rate of a height of a beam of light in an optic system where light passes on the center axis of the lens array 100 to a size of a structure of the optic system is close to 1. Therefore, when a pencil of light beams passing through the aperture stop passes from the 2nd lens 120 to the 6th lens 150, the light beams are able to travel in only one direction of all sides forming the lens array 100. Therefore, it is possible to cut and process the parts of the 3rd to 6th lenses which are positioned below the line X-X' and through which the light beams do not pass, as indicated by a line X-X' in FIG. 2. The parts of these lenses through which the light beams do not pass are cut as shown in FIG. 3, thereby is reducing the whole height of the lens array 100.

Further, as described above, the lens array 100 comprises the 1st to 6th lenses which are telecentric lenses. The 1st to 6th lenses are arranged in the order of positive, positive, negative, positive, positive and positive refractive power. The refractive power of each lens will be additionally described with reference to Table 1 below:

Table 1 indicates the focal distances of the 1st lens 110 to the 6th lens 150 of the lens array 100 used in the present invention. In Table 1, since the two lens sheets, i.e., the 3rd lens 130a and the 4th lens 130b, form the single doublet lens, these may be indicated as the 3rd lens group. As shown in Table 1, since the 6th lens 150 has $f_6<12$, it is designed to have the highest refractive power among the lenses of the lens array 100.

TABLE 1

| Lens (group) No. | Side No. | Focal Distance |
|---|---|---|
| 1 | 1~2 | 45.00 |
| 2 | 3~4 | 15.66 |
| 3 | 5~6 | −5.69 |
| 4 | 6~7 | 7.86 |
| 3-4 (3rd group) | 5~7 | −13.51 |
| 5 | 8~9 | 55.99 |
| 6 | 10~11 | 11.98 |
| 1~6 (array) | 1~11 | 10.37 |

Below, Table 2 indicates the refractive power of each of the 1st lens 110 to the 6th lens 150 of the lens array 100 used in the present invention. In Table 2, since the two lens sheets, i.e., the 3rd lens 130a and the 4th lens 130b, form the single doublet lens, these are indicated as the 3rd lens group.

TABLE 2

| Lens (group) No. | Side No. | Refractive Power (K) |
|---|---|---|
| 1 | 1~2 | 0.022 |
| 2 | 3~4 | 0.064 |
| 3-4 (3rd group) | 5~7 | −0.074 |
| 5 | 8~9 | 0.018 |
| 6 | 10~11 | 0.083 |
| 1~6 (array) | 1~11 | 0.096 |

The refractive power of each lens means a reciprocal of the focal distance of the lens or the refractive side. A refractive power value is found by the following formula:

$$K=(n'-n)(1/R_1/R_2),$$

wherein n' is a refractive index of a lens, n is a refractive index of air, $R_1$ is a curvature of a 1st side of the lens, and $R_2$ is a curvature of a 2nd side of the lens. Further, when the total refractive power of the lens array 100 is K, K=1/EFL (EFL is an effective focal distance).

An image to be formed on the image panel 400 is separated into R, G and B by a spectroscope system of the projector (not shown), color composition is completed by a color composition unit of an illumination system, and then the image is formed on the image panel 400. The image passes through the prism 300 which shortens a light path and passes through the 11th and 10th sides of the 6th lens 150.

The Abbe number of the 6th lens 150 used in the present invention is 60.3 and the focal distance $f_6$ is 11.98 mm.

Further, the light converged from the 6th lens 150 passes through the 9th and 8th sides of the 5th lens 140. The Abbe number of the 5th lens 140 is 55.8 and the focal distance $f_5$ is 55.99 mm.

As noticed from the array of the 5th lens 140 and the 6th lens 150, the 5th lens 150 is arrayed such that the side having the smaller absolute value of a radius of curvature is positioned toward the prism 300 and the 6th lens 150 is arrayed such that its two sides have the equal radius of curvature. The light is converged at the 3rd lens group 130 through the 6th lens 150 and the 5th lens 140.

The 3rd lens group 130 consists of a first element lens 130a and a second element lens 130b and has the three lens sides, i.e., the 5th, 6th and 7th sides. The doublet lens is used, in which the focal distance $f_3$ of the 3$^{rd}$ lens group 130 is −13.51 mm. Preferably, the 3$^{rd}$ lens group 130 may be designed such that the 7$^{th}$ side having the great absolute value of the radius of curvature is positioned toward the prism 300 and the 5$^{th}$ side having the small absolute value of the radius of curvature is positioned toward the screen 500. The light is converged at the 2$^{nd}$ lens 120 through the 7$^{th}$ to 5$^{th}$ lenses.

Further, the light converged from the 3$^{rd}$ lens group 130 passes through the 4$^{th}$ and 3$^{rd}$ sides of the 2$^{nd}$ lens 120. The 2$^{nd}$ lens 120 used in the present invention uses the lens having the Abbe number of 29.5 and the focal distance $f_2$ of 15.66 mm. The light passing through the 4$^{th}$ and 3$^{rd}$ sides disperses to be incident on the 1$^{st}$ lens 110.

Subsequently, the incident light dispersed from the 2$^{nd}$ lens 120 passes through the 2$^{nd}$ and 1$^{st}$ sides of the 1$^{st}$ lens 110. The 1$^{st}$ lens 110 used in the present invention uses the lens having the Abbe number of 55.8 and the focal distance $f_1$ of 45.00 mm. The light passing through the 2$^{nd}$ and 1$^{st}$ sides is enlarged to be incident on the screen 500. The 1$^{st}$ side of the 1$^{st}$ lens 110 functions as the stop side, to perform the role of the aperture stop.

In this preferred embodiment, the 1$^{st}$ side of the 1$^{st}$ lens functions as the stop side. However, the present invention is not limited thereto. Even if the stop side were formed on the 2$^{nd}$ side of the 1$^{st}$ lens or between the 1$^{st}$ and 2$^{nd}$ lenses, the overall height of the lens array could be reduced according to the design thereof. That is, in the present invention, it is desirable to position the stop side to be closer to the screen, to reduce the whole height of the lens array.

Further, in this embodiment, the present invention has the constitution of arranging the 3$^{rd}$ lens group 130, to improve the performance of the lens, including the aberration, distortion or the like of the optical lens. However, any one of the 1$^{st}$ to 6$^{th}$ lenses may use an aspherical lens or doublet lens.

As described above, in designing the lens array made of six lens sheets, preferably, the 1$^{st}$ lens 110 and the 6$^{th}$ lens 150 may use the lens having the high surface hardness, considering the occurrence of a scratch on the surfaces of the lenses.

Taking these points in consideration, the present invention uses the 1$^{st}$ lens 110 and the 5$^{th}$ lens 140 which are the aspherical lenses, to improve the performance of the projection lens. The aspherical lens according to the present invention is found by the following Formula I:

$$X = \frac{Y^2/R}{1+\sqrt{1-(1+K)(Y/R)^2}} + AY^4 + BY^6 + CY^8 + DY^{10} + EY^{12} + FY^{14}$$ [Formula 1]

wherein X and Y indicate directions, i.e., an X-axis indicates an optical axis direction and a Y-axis indicates a direction being at right angles to the optical axis. An asphere is a curve obtained by coaxially rotating a curve obtained by [Formula 1]. Then, R is the radius of curvature of the lens, K is the conic constant, and each of A, B, C, D, E and F is an aspherical coefficient.

As described above, in the lens array 100 for a pico-projector according to the present invention, where each of the focal distances of the 1$^{st}$ to 6$^{th}$ lenses are $f_1$, $f_2$, $f_{3-4}$, $f_5$, and $f_6$, preferably, the whole focal length f may be 10 mm to 11 mm.

Further, in the lens array 100 for a pico-projector, the composite focal distance $f_{1-2}$ of the 1$^{st}$ lens and the 2$^{nd}$ lens and the composite focal distance $f_{3-6}$ of the 3$^{rd}$ lens to the 6$^{th}$ lens satisfy the following formula: $1<|f_{1-2}/f_{3-6}|<2$. More preferably, $|f_{1-2}/f_{3-6}|=1.27961$ mm.

Further, the focal distance $f_2$ of the 2$^{nd}$ lens and the focal distance $f_6$ of is the 6$^{th}$ lens satisfy the following formula: $1<|f_2/f_6|<2$. More preferably, $|f_2/f_6|=1.31$ mm. Preferably, the composite focal distance $f_{1-2}$ may be from 12 mm to 15 mm and the composite focal distance $f_{3-6}$ may be from 9 mm to 10 mm.

As described above, in the projection lens unit for a pico-projector according to the present invention, since the diaphragm aperture which is one of the elements constituting the lens array is positioned on the 1$^{st}$ side of the 1$^{st}$ lens, all sides of the lens array are not required and parts of the lens sides are used in projecting an image. Therefore, the height of the lens array is reduced.

The invention has been described using a preferred exemplary embodiment. However, it is to be understood that the scope of the invention is not limited to the disclosed embodiment. On the contrary, the scope of the invention is intended to include various modifications and alternative arrangements within the capabilities of persons skilled in the art using presently known or future technologies and equivalents. The scope of the claims, therefore, should be accorded the broadest interpretation so as to encompass all such modifications and similar arrangements.

What is claimed is:

1. A projection lens unit for a pico-projector which comprises a lens array, a color composition prism, a cover glass and an image panel, the projection lens unit characterized in that:
   the lens array includes 1$^{st}$ to 6$^{th}$ lenses sequentially arrayed from a screen on which an image is projected,
   the 1$^{st}$ lens includes a stop side formed on a 1$^{st}$ side of the 1$^{st}$ lens, the stop side stops the passage of light, to perform the function of an aperture stop, light passing from the 1$^{st}$ tens to the 6$^{th}$ lens travels in only one direction of the lens sides based on the aperture stop, and parts of the lens sides through which the light does not pass are cut so that the whole height of the lens array is reduced, and
   wherein the full length from the 1$^{st}$ side of the 1$^{st}$ lens to a 2$^{nd}$ side of the 6$^{th}$ lens is 13 mm or less and two of the 1$^{st}$ to 6$^{th}$ lenses are aspherical lenses.

2. The projection lens unit according to claim 1, wherein the 1$^{st}$ lens has a positive (+) refractive power,
   the 2$^{nd}$ lens has the positive (+) refractive power,
   the 3$^{rd}$ lens has a negative (−) refractive power,
   the 4$^{th}$ lens has the positive (+) refractive power,
   the 5$^{th}$ lens has the positive (+) refractive power,
   the 6$^{th}$ lens has the positive (+) refractive power, and
   the 3$^{rd}$ and 4$^{th}$ lenses form a single doublet lens.

3. The projection lens unit according to claim 1, wherein the 1$^{st}$ lens and 5$^{th}$ lens are the aspherical lenses having high hardness.

4. The projection lens unit according to claim 1, wherein, where focal distances from the 1$^{st}$ lens to the 6$^{th}$ lens each are $f_1$, $f_2$, $f_{3-4}$, $f_5$, and $f_6$, a composite focal distance $f_{1-2}$ of the 1$^{st}$ lens and the 2$^{nd}$ lens and a composite focal distance $f_{3-6}$, of the 3$^{rd}$ lens to the 6$^{th}$ lens satisfy the following formula:

$1<|f_{1-2}/f_{3-6}|<2$.

5. The projection lens unit according to claim 4, wherein the focal distance $f_2$ of the 2$^{nd}$ lens and the focal distance $f_6$ of the 6$^{th}$ lens satisfy the following formula:

$1<|f_2/f_6|<2$.

6. The projection lens unit according to claim 4, wherein the composite focal distance is from $f_{1-2}$ is from 12 mm to 15 mm and the composite focal distance $f_{3-6}$ is from 9 mm to 10 mm.

* * * * *